United States Patent
Ryu et al.

(10) Patent No.: US 8,018,973 B2
(45) Date of Patent: Sep. 13, 2011

(54) METHOD TO ACCURATELY AND SECURELY DETERMINE PROPAGATION DELAY AND DISTANCE BETWEEN SENDING AND RECEIVING NODE IN PACKET NETWORK USING CUT-THROUGH APPROACH AND PACKET NETWORK NODE FOR EXECUTING THE METHOD

(75) Inventors: Hyun Surk Ryu, Suwon-si (KR); Geoffrey M. Garner, Red Bank, NJ (US); Cornelis Johannis Den Hollander, Yongin-si (KR); Fei Fei Feng, Yongin-si (KR); Kyu Hong Jung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 952 days.

(21) Appl. No.: 11/600,046

(22) Filed: Nov. 16, 2006

(65) Prior Publication Data

US 2007/0189184 A1  Aug. 16, 2007

Related U.S. Application Data

(60) Provisional application No. 60/772,302, filed on Feb. 11, 2006.

(30) Foreign Application Priority Data

Sep. 1, 2006  (KR) .......................... 10-2006-0084403

(51) Int. Cl.
*H04J 3/06* (2006.01)
*H04L 12/42* (2006.01)
*H04L 12/28* (2006.01)

(52) U.S. Cl. ..................... 370/508; 370/395.42; 370/449

(58) Field of Classification Search ................. 370/392, 370/389, 395.4, 395.42, 410, 412, 503, 428, 370/429, 519, 241, 247, 248, 352, 252, 245; 709/228, 227, 229, 238; 726/26, 28, 29, 726/30, 4, 27
See application file for complete search history.

(56) References Cited

U.S. PATENT DOCUMENTS 5,550,807 A * 8/1996 Kuroshita ..................... 370/252
(Continued)

FOREIGN PATENT DOCUMENTS

JP  08-062334  3/1996
(Continued)

OTHER PUBLICATIONS

Japanese Office Ation issued on Nov. 2, 2010, In corresponding Japanese Patent Application No. 2008-554115 (3 pages).

(Continued)

*Primary Examiner* — Hanh Nguyen
(74) *Attorney, Agent, or Firm* — NSIP Law

(57) ABSTRACT

A method and system for measuring a distance between nodes in a packet network are provided. The system and method include measuring and storing a departure time of a ping packet sent from a source node to a destination node, sending a response packet with respect to the ping packet from the destination node to the source node, cutting through the ping packet or response packet to a successive node or the destination node without an intermediate node delay, computing a round-trip time by measuring an arrival time of the response packet at the source node and measuring the distance between the nodes, based on the round-trip time and speed of the ping packet.

11 Claims, 10 Drawing Sheets

U.S. PATENT DOCUMENTS

| | | | |
|---|---|---|---|
| 6,047,330 A | 4/2000 | Stracke, Jr. ................... 709/238 |
| 6,614,795 B1 | 9/2003 | Jimmei et al. | |
| 6,798,743 B1* | 9/2004 | Ma et al. ........................ 370/235 |
| 6,804,624 B2* | 10/2004 | Silverman ..................... 702/159 |
| 6,915,436 B1 | 7/2005 | Booth, III et al. | |
| 7,310,339 B1* | 12/2007 | Powers et al. ................. 370/394 |
| 7,342,879 B2* | 3/2008 | Gentle .......................... 370/230 |
| 7,436,780 B2* | 10/2008 | Stephens et al. ............. 370/252 |
| 7,529,247 B2* | 5/2009 | Rogers ....................... 370/395.2 |
| 7,606,155 B2* | 10/2009 | Higashida .................... 370/235 |
| 2002/0087666 A1 | 7/2002 | Huffman et al. | |
| 2002/0129150 A1 | 9/2002 | Jung ............................. 709/227 |
| 2002/0194361 A1* | 12/2002 | Itoh et al. ..................... 709/233 |
| 2003/0035425 A1 | 2/2003 | Abdollahi et al. ............ 370/370 |
| 2004/0063454 A1 | 4/2004 | Sasaki ........................... 455/522 |
| 2004/0133391 A1 | 7/2004 | Bovo et al. | |
| 2005/0058081 A1 | 3/2005 | Elliott | |
| 2005/0073961 A1 | 4/2005 | Paik et al. ..................... 370/252 |
| 2006/0288424 A1* | 12/2006 | Saito .............................. 726/26 |
| 2008/0071924 A1* | 3/2008 | Chilukoor ..................... 709/240 |

FOREIGN PATENT DOCUMENTS

| | | |
|---|---|---|
| JP | 08-265366 | 10/1996 |
| JP | 2000-332715 | 11/2000 |
| JP | 2004-128798 | 4/2004 |
| KR | 10-2004-104395 | 12/2004 |

OTHER PUBLICATIONS

Hollander et al., "Use of Timing and Synchronization Mechanisms in Packet Networks to Determine Physical Distance Between End-Stations," Converged Residential Ethernet, Jan. 29, 2006, slides 1-27.

* cited by examiner

METHOD TO ACCURATELY AND SECURELY DETERMINE PROPAGATION DELAY AND DISTANCE BETWEEN SENDING AND RECEIVING NODE IN PACKET NETWORK USING CUT-THROUGH APPROACH AND PACKET NETWORK NODE FOR EXECUTING THE METHOD

CROSS-REFERENCE TO RELATED APPLICATIONS

This application claims the benefit under 35 U.S.C. §119(e) of U.S. patent application Ser. No. 60/772,302, filed on Feb. 11, 2006, in the U.S Patent and Trademark Office, and claims the benefit under 35 U.S.C. §119(a) of Korean Patent Application No. 2006-84403, filed Sep. 1, 2006 in the Korean Intellectual Property Office, the entire disclosures of both of which are hereby incorporated by reference.

BACKGROUND OF THE INVENTION

1. Field of the Invention:

The present invention relates to a method of precisely and securely measuring a propagation delay and a distance between nodes. More particularly, the present invention relates to a method of measuring propagation delay and a distance between nodes by using a cutting through process in a packet network and a packet network node executing the same.

2. Description of the Related Art:

Applications provided via a packet network may require digital rights management (DRM). DRM is a bundling of technologies supporting generation, distribution, and management of contents, such as securely protecting rights and profits of content providers, preventing illegal copies, imposing fees, and supporting payment agencies. A digital rights management includes technology for enabling only a legal user to use contents, a software and security technology for approving and executing copyright, and payment technology for enabling payment of a suitable fee.

To acquire an application requiring DRM, a digital media player (hereinafter, referred to as a player node) may be connected to a digital media server (hereinafter, referred to as a server node) via a packet network. In this case, an owner of the application may want to provide and replay the application in a geographically limited area.

For example, an owner of digital video disc (DVD) contents may request the contents to be transmitted and replayed by users in a certain area and not to be transmitted or replayed out of the certain area. To execute this request, a server node providing the contents has to determine whether a player node exists within a threshold distance.

In a conventional technology, to determine a distance between a server node and a player node, the server node sends a ping packet to the player node, measures a round-trip time of the ping packet, and determines a distance between the server node and the player node.

Namely, the server node sends a ping packet and records a departure time of the ping packet. The player node responds to the server node via a response packet corresponding to the received ping packet. The server node computes a round-trip time of the ping packet by an arrival time of the response packet and the departure time of the ping packet. When the round-trip time is over a predetermined delay threshold, the server node determines that the player node is out of the threshold distance and does not establish a connection to send contents.

In the conventional technology, a ping packet and a response packet may have a serious queuing delay occurring at intermediate nodes. This delay also occurs when giving a priority to the ping packet and the response packet in a non-preemptive type packet network. In such a network, the ping packet or response packet is processed after processing a frame previously being transmitted before an arrival of the ping packet or response packet.

For example, with a maximum size Ethernet frame including 1518 bytes of payload in 100 Mbps Ethernet, a queuing delay of 121 microseconds may occur in one node. Specifically, even though a ping packet passes through a small number of intermediate nodes, a considerable amount of queuing time delays in the order of milliseconds may occur. In addition, the greater the number of intermediate nodes, the greater the amount of time of the total queuing delays.

Also, in the conventional technology, when a dedicated unit is not used or a highest pre-emptive priority for processing the ping packet is not given in a process of receiving a ping packet at a player node and sending a response packet corresponding to the ping packet at a server, an additional queuing delay may occur.

Considering a delay for propagating a signal in a typical local area network (LAN) or a wide area network (WAN) of 8 nanoseconds per meter, the delay with respect to 30-100 meters will be 240 to 800 nanoseconds, namely, a time less than 1 microsecond. Hence the above queuing delay may greatly exceed the delay for propagating a signal over a threshold distance.

FIG. 1 is a diagram illustrating a conventional method of determining a propagation delay and a distance between nodes in a packet network. A server node 101 sends a ping packet 103 to a player node 102 to measure a distance between the server node 101 and the player node 102. In this case, the ping packet 103 may pass through one or more intermediate nodes 104. Though the ping packet 103 has a higher priority than other packets waiting to be sent at the intermediate node 104, a queuing delay occurs due to a packet being sent in a non-preemptive type packet network 100.

In this case, the ping packet 103 waits at the intermediate node 104 until sending of a packet 106 is completed, and therefore has the queuing delay greater than the propagation delay between nodes as described above. During the queuing delay, the ping packet may be stored in a storage 105.

To consider the queuing delay, a delay threshold in a packet network has to be established to be greater than a sum of propagation delays. However, determining a time limit for the delay threshold to be sufficient enough to avoid a refusal of providing a service to a legal user may cause a decrease in reliability of the packet network because a service may be provided to a player node beyond a threshold distance when the packet network is lightly loaded.

Accordingly, there exists a need for a method of precisely and securely measuring a propagation delay and a distance between nodes in a packet network, and a packet network node executing the same.

SUMMARY OF THE INVENTION

Exemplary embodiments of the present invention address at least the above problems and/or disadvantages and provide at least the advantages described below. Accordingly, an exemplary aspect of the present invention provides a method of precisely and securely measuring a propagation delay and a distance between nodes by cutting through in a packet network, and a packet network node executing the method.

An exemplary aspect of the present invention is to precisely and securely measure a propagation delay and a distance between nodes by cutting through, eliminating an intermediate node delay by a process of giving a pre-emptive priority to a ping packet or response packet, storing other packets currently in transmission or waiting for transmission, and resending the other packets after completion of transmission of the ping packet or response packet when the ping packet or response packet that is not destined for a certain node in a packet network is received by the same node.

An additional exemplary aspect of the present invention is to more precisely measure a propagation delay and a distance by changing a field of a ping packet and sending the ping packet to a source node of the ping packet as a response packet when the ping packet whose destination is a certain node is received.

An additional exemplary aspect of the present invention is to perform digital rights management (DRM) of contents by allowing a destination node within a desired distance or zone to establish connection or replay of the contents, by determining the distance.

According to an exemplary aspect of the present invention, there is provided a method of measuring a distance between nodes in a packet network, the method including transmitting a ping packet from a first node to a second node through at least one of a plurality of third nodes, determining a departure time of the ping packet, transmitting a response packet with respect to the ping packet from the second node to the first node through the at least one of the plurality of the third nodes, prioritizing a transmission of at least one of the ping packet and response packet from the at least one of the plurality of third nodes, determining a round-trip time by determining an arrival time of the response packet, and determining a distance based on the round-trip time and a speed of the ping packet.

An exemplary operation of prioritizing of the transmission of the at least one of the ping packet and response packet without delay may include receiving the at least one of the ping packet and the response packet by at least one of the third nodes, giving priority to the received at least one of the ping packet and response packet, storing other packets being sent or waiting for transmission, suspending transmission of the other packets, transmitting the received at least one of the ping packet and response packet to at least one of another third node and the second node, and resuming transmission of the other packets after the transmission of at least one of the ping packet and response packet is completed.

An exemplary operation of transmitting a response packet with respect to the ping packet from the second node to the first node may include exchanging an address of the first node included in the ping packet with an address of the second node included in the ping packet, changing a packet type identifier included in the ping packet from a ping type to a response type and sending the ping packet to the first node, as the response packet.

Each of the first node, the second node and the plurality of third nodes comprise a dedicated unit for processing a input packet input and each of the first node, the second node and the at least one of the plurality of third nodes of the packet network processes the ping packet, the response packet, or the intermediate node delay via the dedicated unit.

According to another exemplary aspect of the present invention, there is provided a method of processing a packet in a dedicated unit included in each node in a packet network, the method including receiving a packet at a node in a packet network, determining a packet kind of the packet received at the node and processing the packet at the node, based on the packet kind.

BRIEF DESCRIPTION OF THE DRAWINGS

The above and/or other aspects and advantages of embodiments of the present invention will become apparent and more readily appreciated from the following detailed description, taken in conjunction with the accompanying drawings of which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Reference will now be made in detail to exemplary embodiments of the present invention, examples of which are illustrated in the accompanying drawings.

Figure 1:
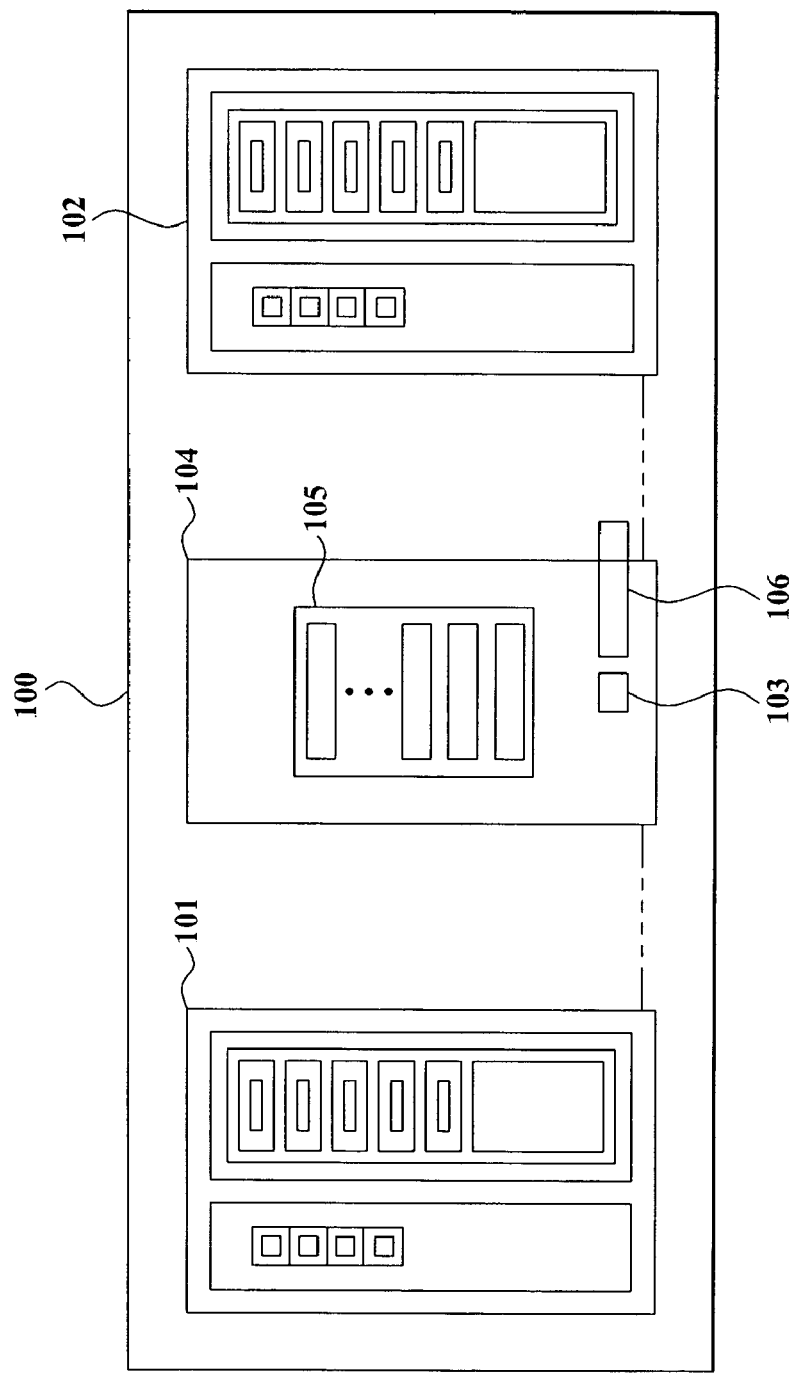
FIG. 1 is a diagram illustrating a conventional method of determining a propagation delay and a distance between nodes in a packet network.
Figure 2:
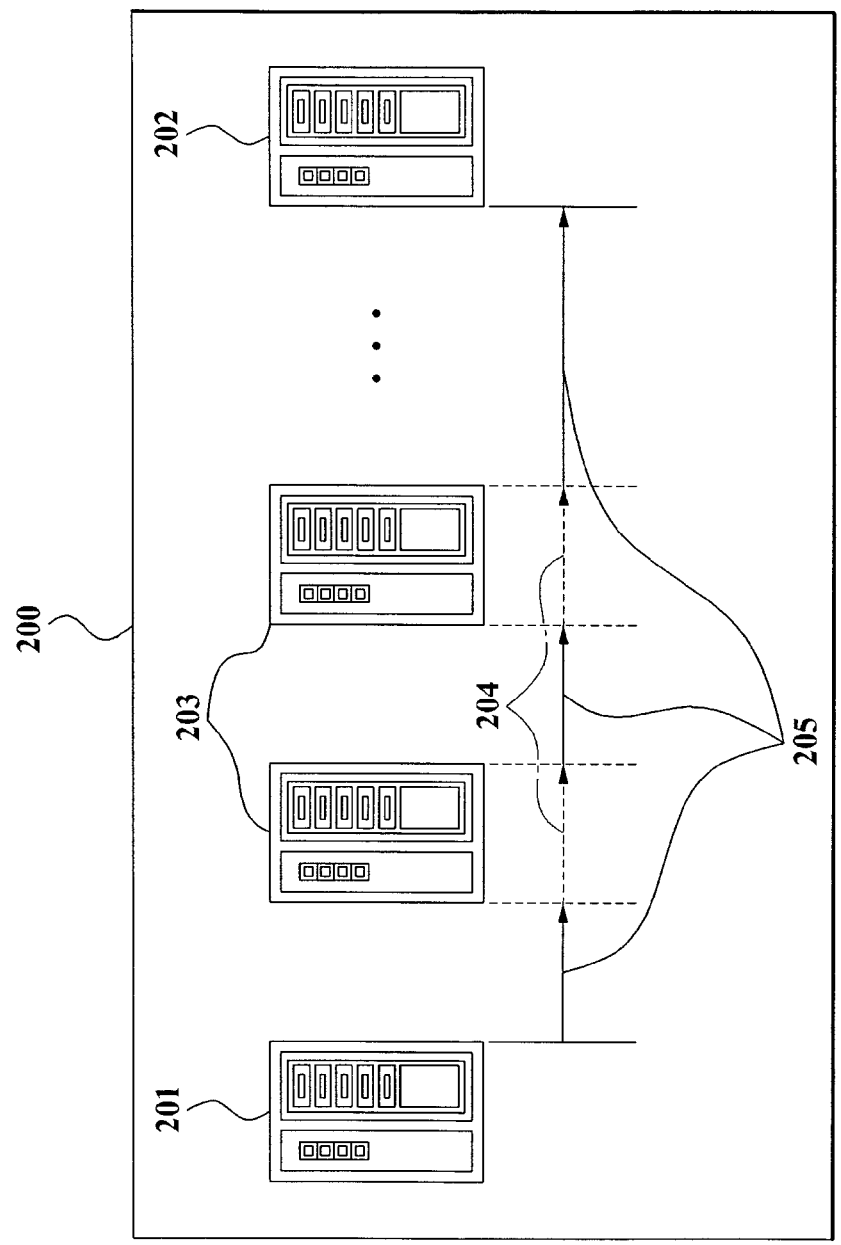
FIG. 2 is a diagram illustrating a method of measuring a propagation delay and a distance between nodes in a packet network, according to an exemplary embodiment of the present invention.

FIG. 2 is a diagram illustrating a method of measuring a propagation delay and a distance between nodes in a packet network 200, according to an exemplary embodiment of the present invention. Referring to FIG. 2, when a ping packet sent from a source node 201 of the packet network 200 passes through at least one intermediate node 203 while being sent to a destination node 202, an intermediate node delay 204 that is a time delay at the intermediate node 203 may occur.

In an exemplary embodiment, a propagation delay 205 between the source node 201 and the destination node 202 may be precisely measured by removing the intermediate node delay 204, and a distance between the source node 201 and the destination node 202 may be determined by using the propagation delay 205.

The determined distance is used for digital rights management (DRM) of contents to establish a valid distance with respect to the contents and to send or replay the contents within the valid distance.

Hereinafter, an exemplary method of measuring a propagation delay and a distance between nodes by removing an intermediate node delay at an intermediate node will be described in detail.

Figure 3:
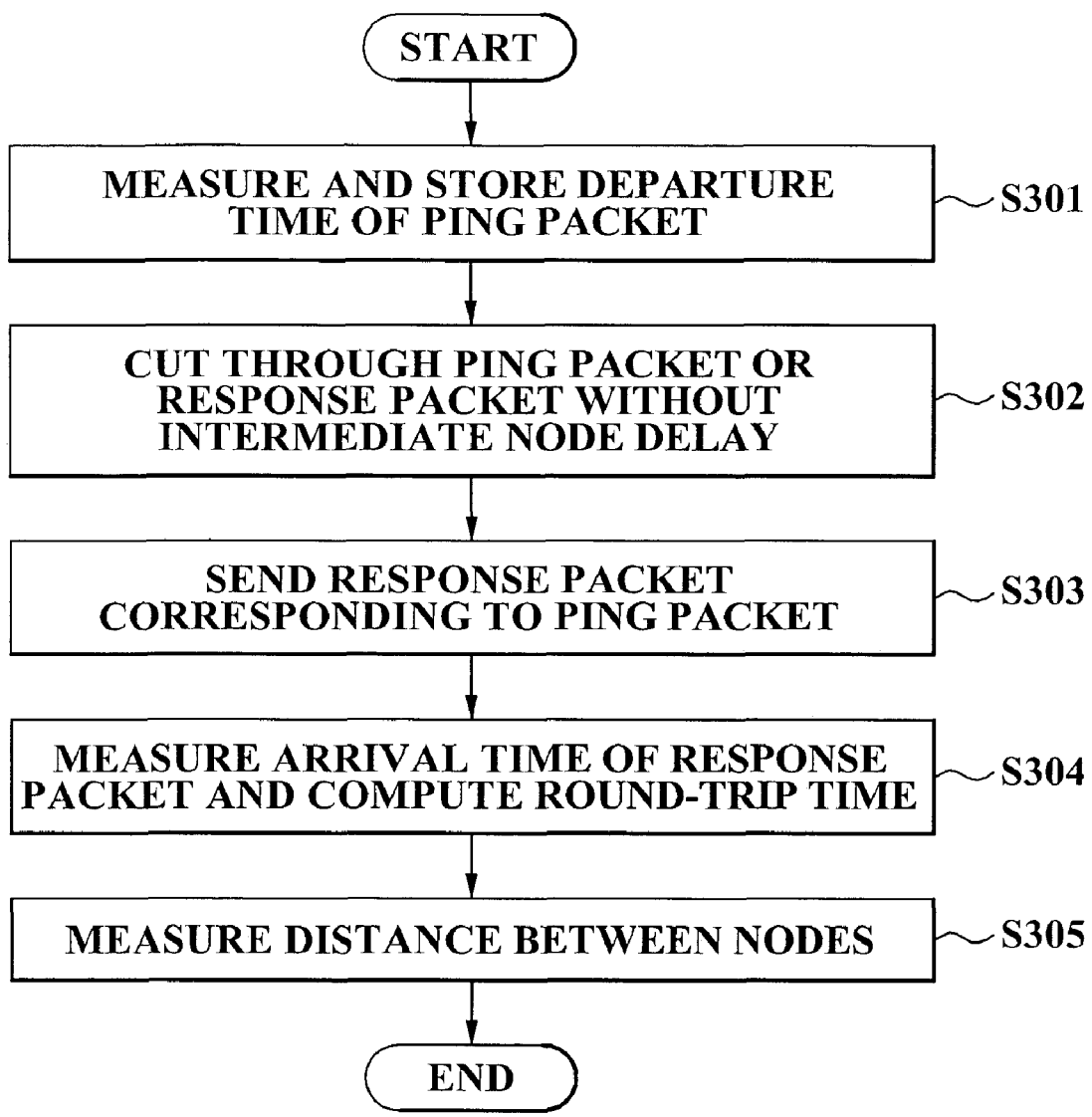
FIG. 3 is a flowchart illustrating the method of measuring a distance between nodes in a packet network according to an exemplary embodiment of the present invention.

FIG. 3 is a flowchart illustrating an exemplary method of measuring a distance between nodes in a packet network.

In operation S301, a source node sending a ping packet to a destination node measures and stores a departure time of the ping packet. The departure time may be used for measuring a round-trip time of the ping packet.

In operation S302, an intermediate node, through which the ping packet passes while being sent from the source node to the destination node, causes the ping packet to cut through to a successive node or the destination node without an intermediate node delay. Similarly a response packet is caused to cut through at an intermediate node while being sent from a destination node to the source node. The method of removing the intermediate node delay will be described in detail, referring to FIGS. 4 and 5.

In operation S303, the destination node sends a response packet, with respect to the ping packet, to the source node. To reduce a delay at the destination node, the destination node changes a field of the ping packet and sends the ping packet, as the response packet, without newly generating a response packet, to the source node. Operation S303 will be described in detail, referring to FIG. 6.

In operation S304, the source node measures an arrival time of the response packet and computes the round-trip time. The round-trip time may be computed by using a difference between the arrival time and the departure time measured in operation S301. The round-trip time from which the intermediate node delay is removed may be used for determining whether to establish a connection with the destination node or whether transmission of contents is permissible.

Namely, the source node may determine a time limit for the delay threshold with respect to the round-trip time and may restrict the establishment of the connection or the transmission of the contents when the round-trip time exceeds a time limit for the delay threshold.

In operation S305, the source node determines a distance between the nodes, based on the round-trip time and the propagation speed of the ping packet. Each node of the packet network may process the ping packet, the response packet, or the intermediate node delay by using a dedicated unit for processing a packet input to the node.

As described above, establishing a connection or replaying contents is allowed to a destination node within a desired distance or area by determining the round-trip time or the distance between nodes, thereby performing DRM.

Figure 4:
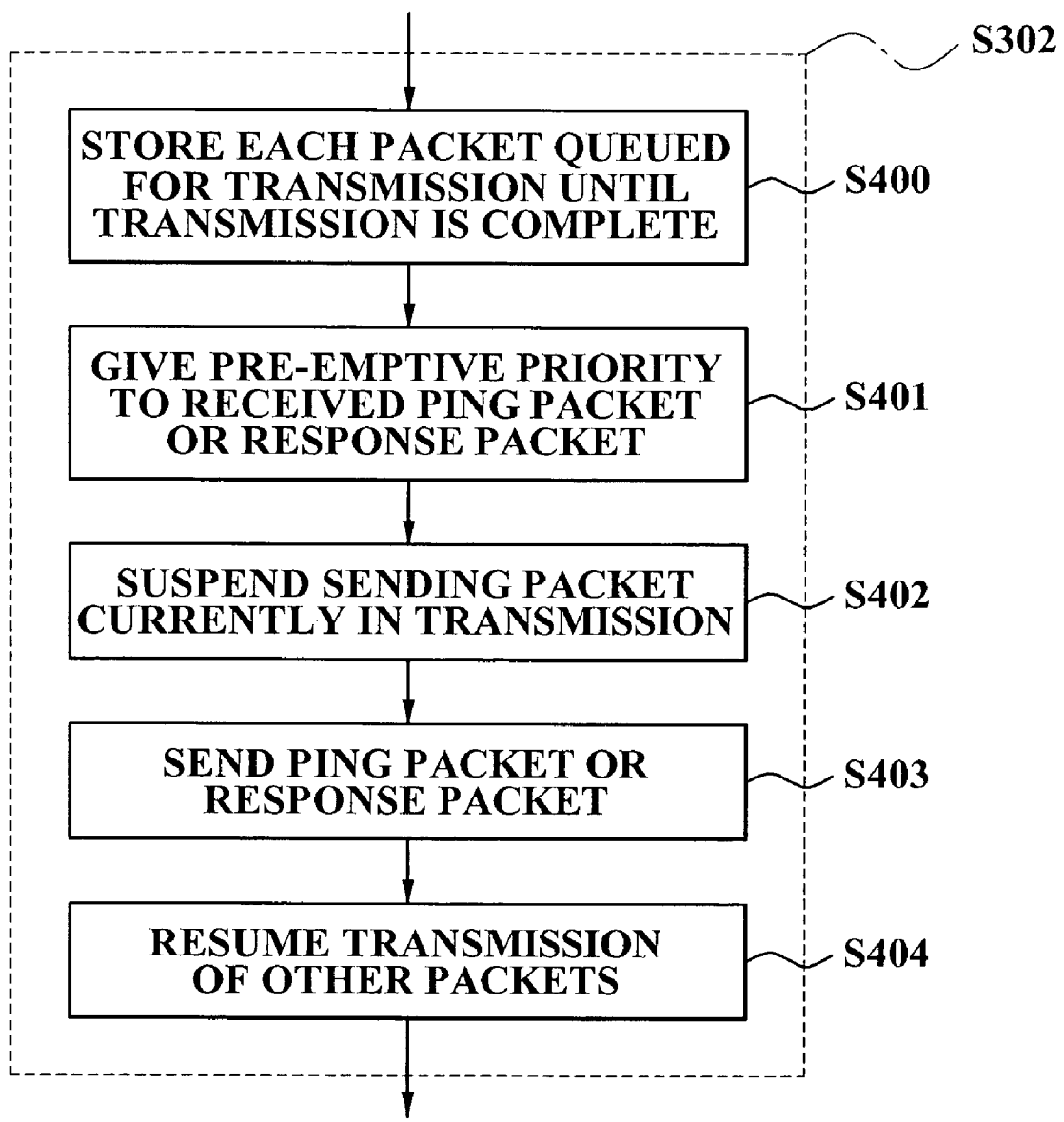
FIG. 4 is a flowchart illustrating a method of sending a ping packet or response packet without an intermediate node delay at an intermediate node, according to an exemplary embodiment of the present invention.

FIG. 4 is a flowchart illustrating a method of sending a ping packet or response packet without an intermediate node delay at an intermediate node, according to an exemplary embodiment of the present invention. Referring to FIG. 4, sub-operations S400 through S404 may be performed or included in operation S302 illustrated in FIG. 3.

In sub-operation S400, the intermediate node stores each packet for transmission until transmission of the ping packet or the response packet is complete.

In sub-operation S401, the intermediate node gives a pre-emptive priority to the ping packet or response packet when receiving the ping packet or response packet. Since the ping packet or response packet pre-empts resources related to a sending unit of the intermediate node, the ping packet or response packet may be sent prior to other packets already received and waiting for transmission at the node.

In sub-operation S402, the intermediate node stores the other packets currently being sent or waiting for transmission and suspends sending. With respect to the other packets currently being sent, even though a part of the packet is already sent, all bytes of the packet may be stored.

In sub-operation S403, the intermediate node sends the ping packet or response packet to the successive node or the destination node.

In sub-operation S404, the intermediate node resumes transmission of the other packets after completion of transmission of the ping packet or response packet including resending packets that have been partially sent.

Figure 5:
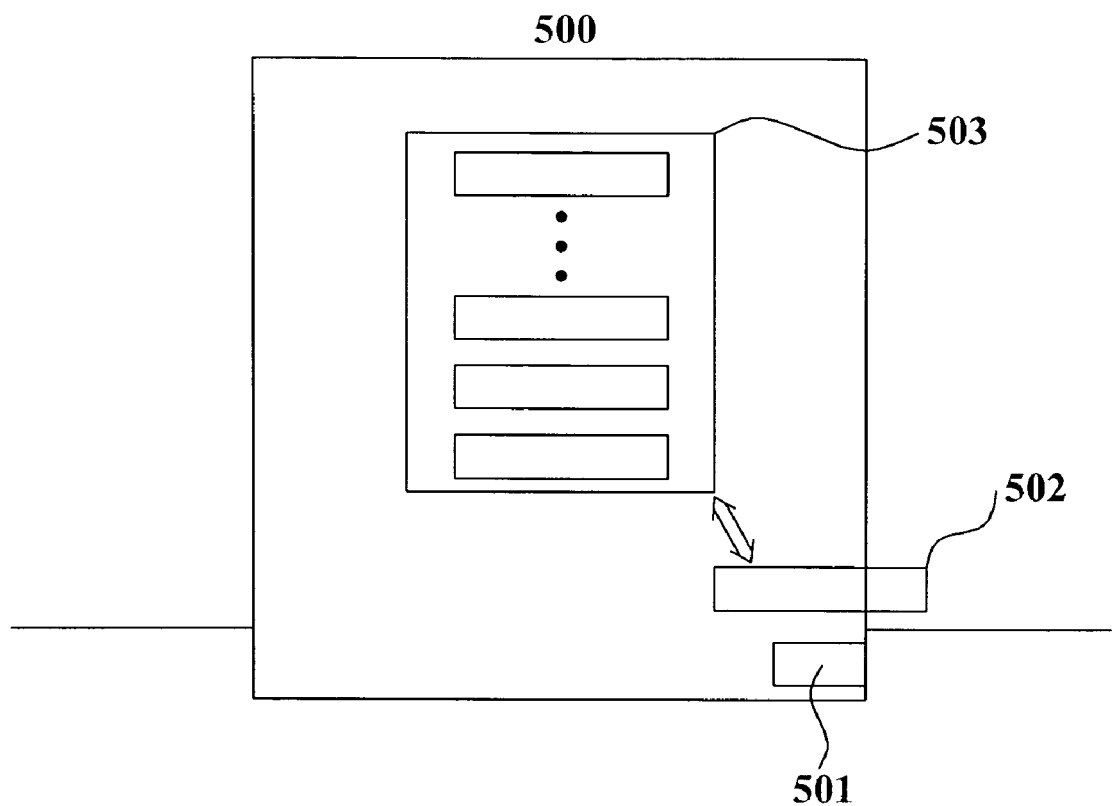
FIG. 5 illustrates an example of a method of removing an intermediate node delay at an intermediate node according to an exemplary embodiment of the present invention.

FIG. 5 illustrates an example of a method of removing an intermediate node delay at an intermediate node 500, according to an exemplary embodiment of the present invention. Referring to FIG. 5, the intermediate node 500 gives a pre-emptive priority to a ping packet 501 to remove an intermediate node delay and suspends transmission of another packet 502 currently being sent or waiting for transmission. The other packet 502 was stored on arrival at the node, and is retained until it is successfully transmitted. The other packet 502 waits in a storage 503, such as a buffer or queue, before completion of the transmission of the ping packet 501 and is resent after the completion of the transmission of the ping packet 501. In this case, even though a part of the other packet 502 is already sent, an entirety of the other packet 502 may be stored to be resent.

As described above, the intermediate node delay with respect to the ping packet 501 is removed, thereby more precisely measuring the round-trip time.

Figure 6:
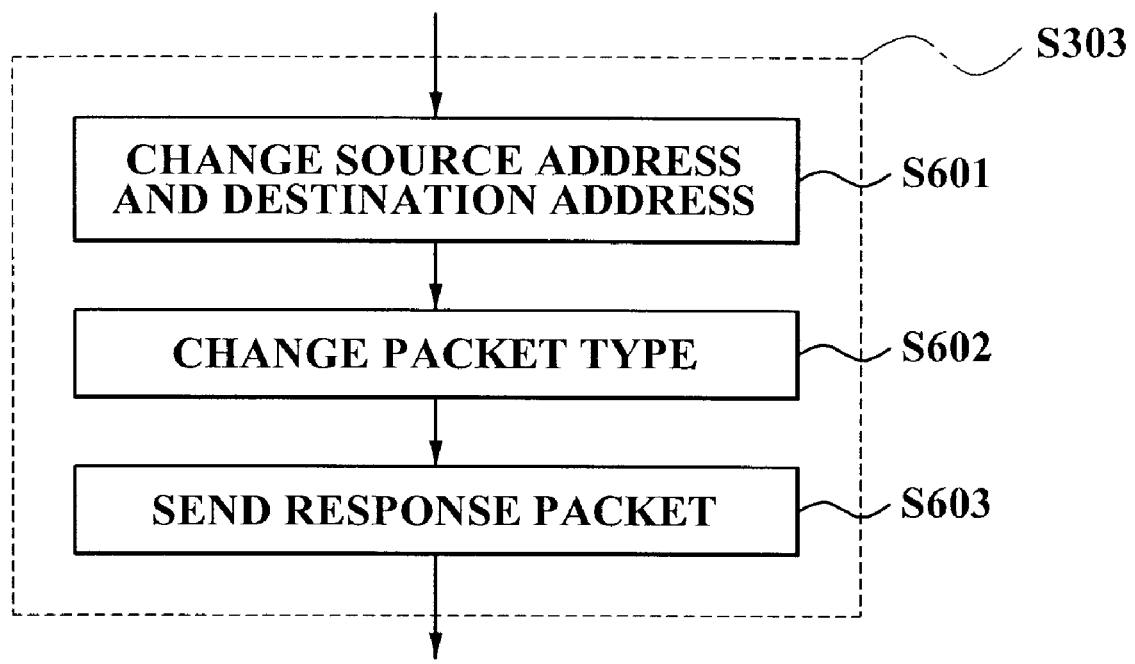
FIG. 6 is a flowchart illustrating a method of sending a response packet with respect to a ping packet, according to an exemplary embodiment of the present invention.

FIG. 6 is a flowchart illustrating a method of sending a response packet with respect to a ping packet, according to an exemplary embodiment of the present invention. Referring to FIG. 6, sub-operations S601 through S603 may be performed included in operation S303 illustrated in FIG. 3.

In sub-operation S601, a destination node receiving the ping packet and sending the response packet exchanges a source address and a destination address included in the ping packet. The source address may be extracted and stored from a source address field of the received ping packet and the destination address of the destination node may be recorded in the source address field.

Also, the extracted and stored source address may be recorded in a destination address field of the ping packet, thereby exchanging the source address and the destination address.

The above exemplary method is possible when a source address is recorded in a first field of the ping packet and a destination address is recorded in a second field. The method is performed in an input order of the ping packet to reduce a delay at the destination node.

In sub-operation S602, the destination node changes a packet type included in the ping packet into a packet type of the response packet. Namely, since the response packet is not newly generated and the ping packet is sent as the response packet by changing the address in sub-operation S601 and the packet type in sub-operation S602, the delay at the destination node may be reduced.

In sub-operation S603, the destination node sends the ping packet to the source node, as the response packet.

Figure 7:
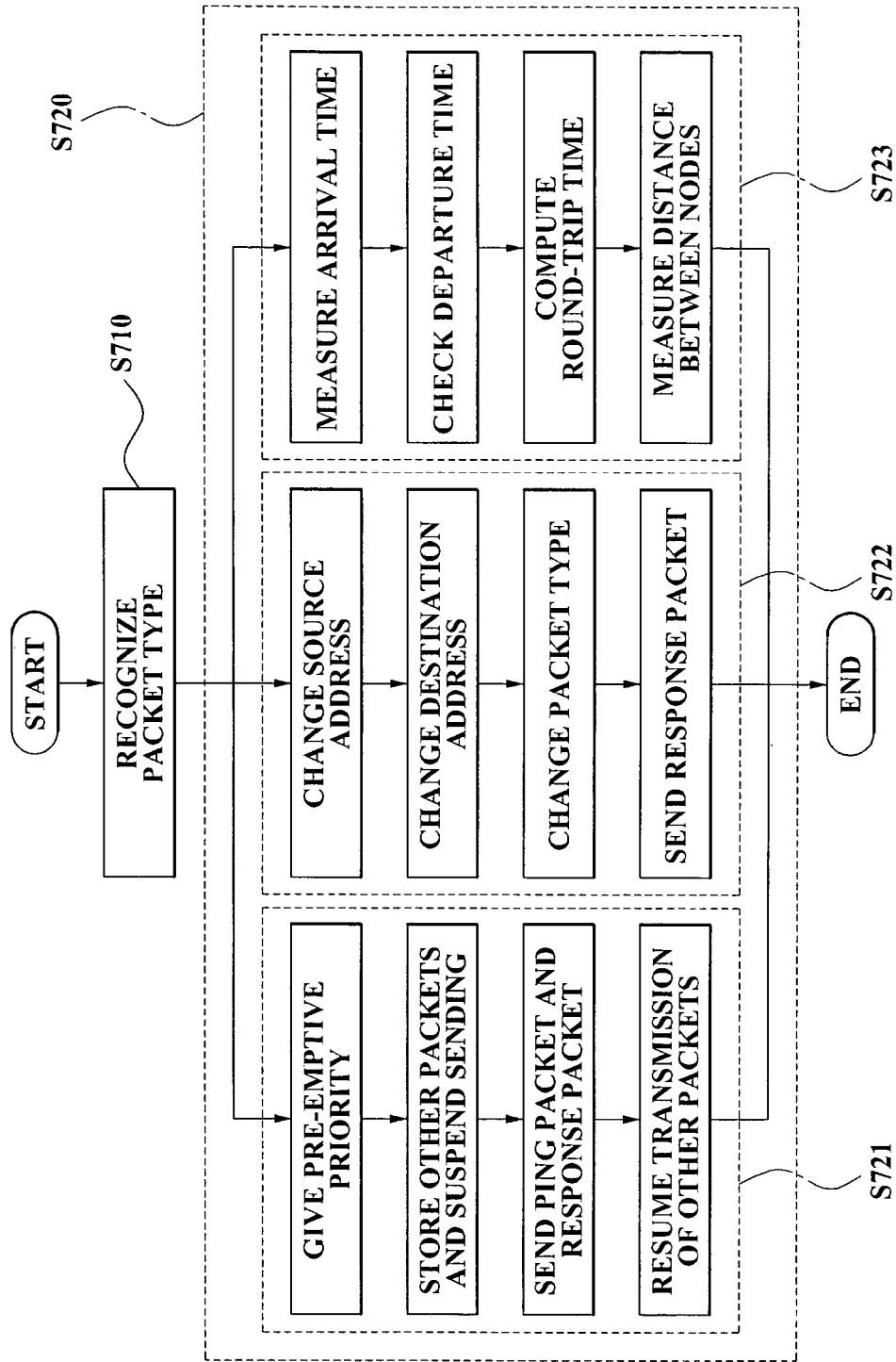
FIG. 7 is a flowchart illustrating a method of processing a packet at a dedicated unit included in each node in a packet network, according to an exemplary embodiment of the present invention.

FIG. 7 is a flowchart illustrating a method of processing a packet at a dedicated unit included in each node in a packet network, according to an exemplary embodiment of the present invention.

In operation S710, the dedicated unit checks a packet received at the node and recognizes a packet kind of the packet. In this case, the packet kind may be recognized by using a destination address and a packet type included in the packet.

In operation S720, the dedicated unit processes the packet according to the packet kind at the node. In this case, operation S720 may include sub-operations S721 through S723.

In sub-operation S721, when the packet kind corresponds to a ping packet or response packet that is not destined for the same node, the dedicated unit removes a delay of the ping packet or response packet at the node and sends the ping packet or response packet to a successive node.

In this case, sub-operation S721 may include giving a pre-emptive priority to the ping packet and/or the response packet when the ping packet and/or the response packet are received, storing other packets currently being sent or waiting for transmission and suspending sending, sending the ping packet and/or the response packet, and resuming transmission of the other packets after completion of transmission of the ping packet and/or the response packet.

In sub-operation S722, when the packet kind is a ping packet destined for the same node, the dedicated unit changes a field of the ping packet and sends the ping packet to a source node of the ping packet, as a response packet.

Also, sub-operation S722 may include changing a source address in a source address field of the ping packet into an address of the node, changing a destination address of the ping packet into the source address, changing a packet type of the ping packet into a packet type of the response packet, and sending the ping packet to the source node, as the response packet.

In addition, the ping packet may respond to authentication of the node by using a security key shared with the packet network.

In sub-operation S723, when the packet kind is a response packet destined for the same node, the dedicated unit computes a round-trip time and measures a distance between the node and a source node of the response packet.

In this case, sub-operation S723 may include measuring an arrival time of the response packet, recognizing a departure time of a ping packet from the node, computing the round-trip time by using a difference between the arrival time and the departure time, and measuring the distance, based on the round-trip time and speed of the ping packet or response packet.

Figure 8:
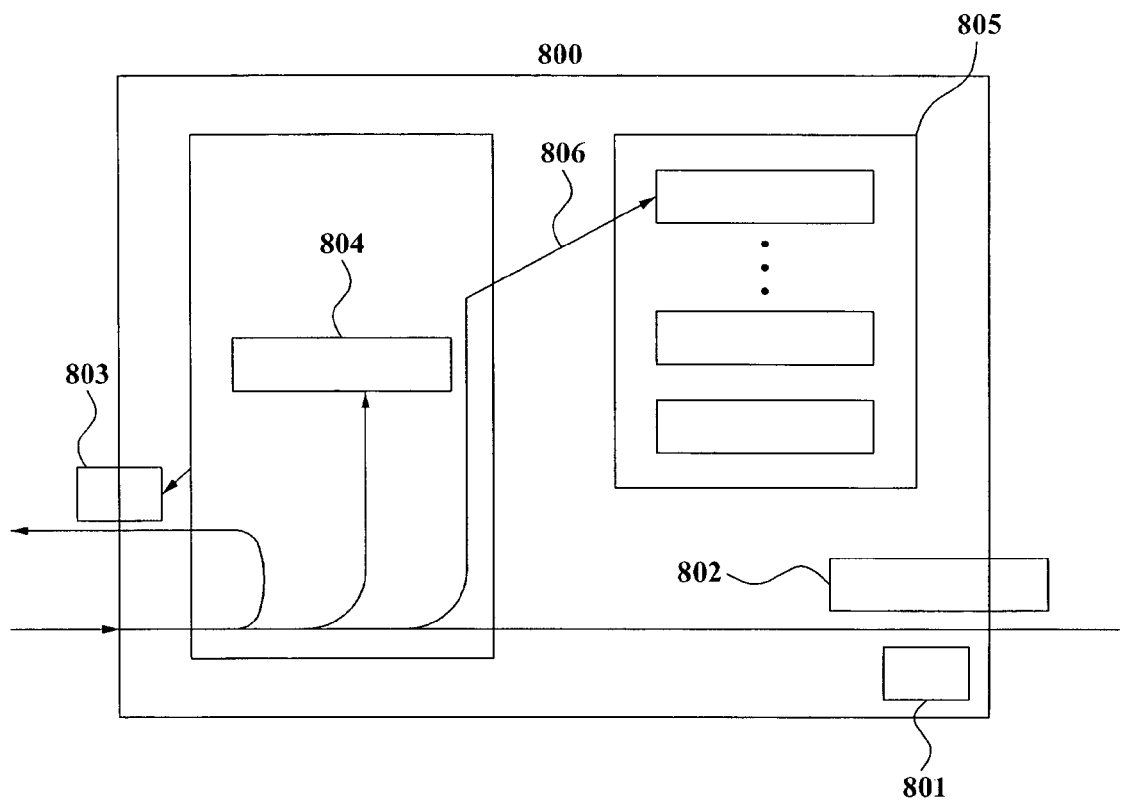
FIG. 8 illustrates an example of the method of processing the packet at a dedicated unit according to an exemplary embodiment of the present invention.

FIG. 8 illustrates an example of a method of processing the packet at a dedicated unit 800. The dedicated unit 800 included in each node of a packet network recognizes a packet kind of a received packet and processes the packet according to the packet kind.

When the packet kind is a ping packet or response packet 801 not destined for a node including the same dedicated unit 800, the dedicated unit 800 removes a delay of the ping packet or response packet 801 at the node and sends the ping packet or response packet 801 to a successive node. In this case, another packet 802 currently being sent or waiting for transmission at the node is preempted, remains stored and waits until completion of transmission of the ping packet or response packet 801.

Also, when the packet kind is a ping packet destined for the node, the dedicated unit 800 changes a field of the ping packet and sends the ping packet to a source node of the ping packet, as a response packet 803.

In addition, when the packet kind is a response packet 804 destined for the node, the dedicated unit 800 computes a round-trip time and measures a distance between the node and a source node of the response packet 804. Additionally, when the packet is a response packet 804 destined for the node, the dedicated unit 800 may route the response packet for storage 806 either after the time and distance computations are made or to allow computations to be made later.

When the packet kind is the other packet 802, the dedicated unit 800 stores the other packet 802 in a storage 805, such as a buffer or queue, until the packet is successfully transmitted.

Figure 9:
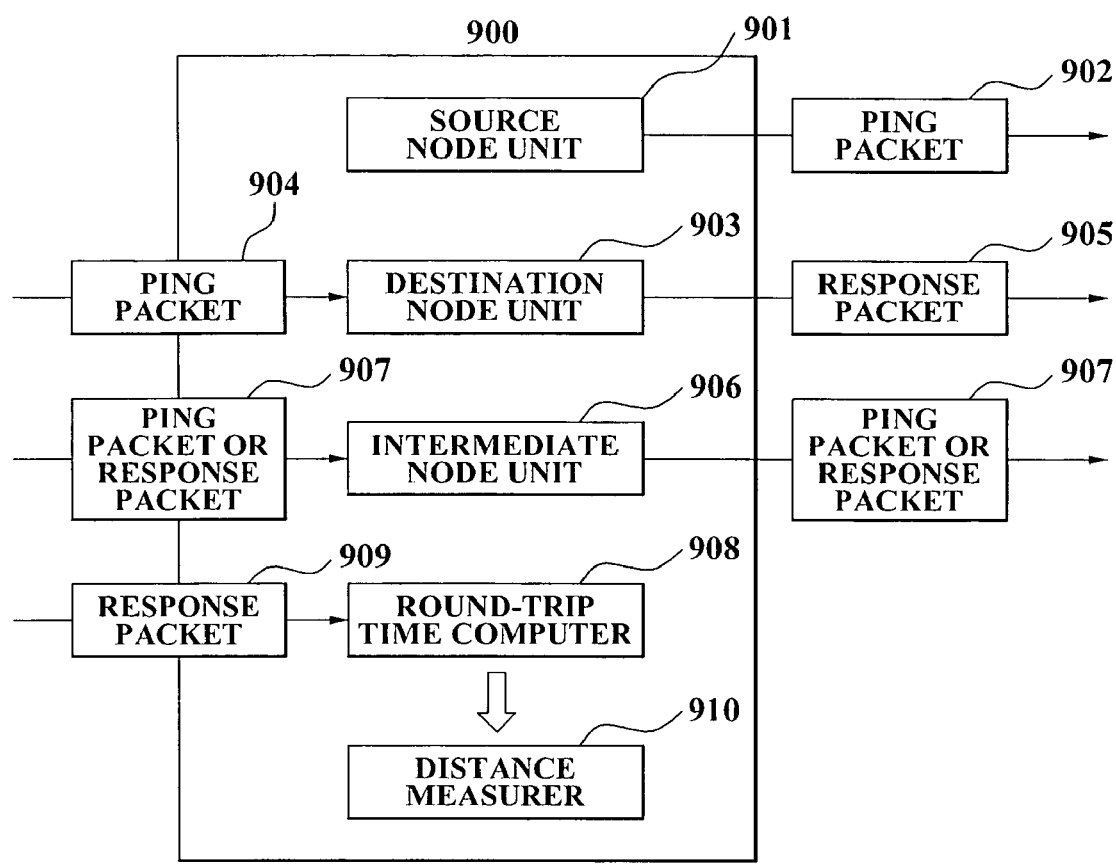
FIG. 9 is a block diagram illustrating an internal configuration of a packet network node measuring a distance between nodes, according to another exemplary embodiment of the present invention.

FIG. 9 is a block diagram illustrating an internal configuration of a node 900 of a packet network, measuring a distance between nodes, according to another exemplary embodiment of the present invention. Referring to FIG. 9, each node 900 included in the packet network may include a source node unit 901, a destination node unit 903, an intermediate node unit 906, a round-trip time computer 908, and a distance measurer 910.

The source node unit 901 measures, stores, and sends a departure time of a ping packet 902, for measuring a distance between nodes. In this case, the departure time may be measured by using a timing signal provided for synchronization by the packet network.

The destination node unit 903 sends a response packet 905 corresponding to a ping packet 904 to a source node when receiving the ping packet 904 destined for the node 900. The destination node unit 903 may include an address exchanger (not shown) exchanging a source address and a destination address included in the ping packet 904, a packet type changer (not shown) changing a packet type of the ping packet 904 into a packet type of the response packet 905, and a packet sender (not shown) sending the ping packet 904 to the source node, as the response packet 905.

The intermediate node unit 906 cuts a ping packet or response packet 907 not destined for the same node 900 through a successive node without an intermediate node delay when receiving the ping packet or response packet 907. An internal configuration of the intermediate node unit 906 will be described in detail, referring to FIG. 10.

The round-trip time computer 908 measures an arrival time of a response packet 909 destined for the node 900 and computes a round-trip time.

The distance measurer 910 measures a distance between the nodes, based on the round-trip time.

As described above, when a certain node of a packet network receives a ping packet or response packet not destined for the same node, a pre-emptive priority is given to the ping packet or response packet and another packet currently being sent or waiting for transmission remains stored and waits until completion of transmission of the ping packet or response packet, thereby cutting through without an intermediate node delay to more precisely determine the propagation delay and a distance between nodes.

Figure 10:
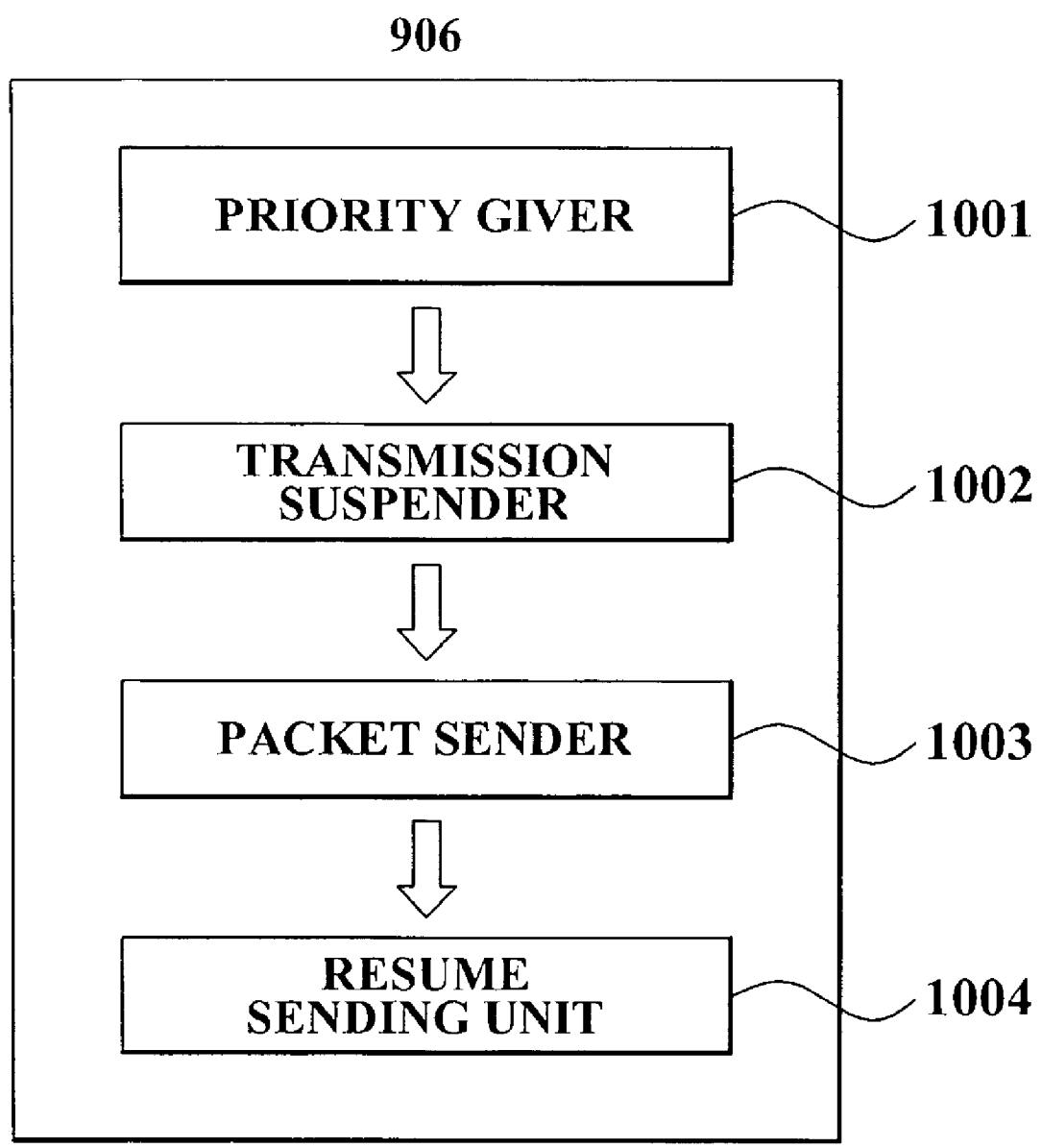
FIG. 10 is a block diagram illustrating an internal configuration of an intermediate node part, according to another exemplary embodiment of the present invention.

FIG. 10 is a block diagram illustrating an internal configuration of an intermediate node part, according to another exemplary embodiment of the present invention. Referring to FIG. 10, an intermediate node unit 906 may include a priority giver 1001, a transmission suspender 1002, a packet sender 1003, and a resume sending unit 1004.

The priority giver 1001 gives a pre-emptive priority to a ping packet or response packet when receiving the ping packet or response packet. Since the ping packet or response packet pre-empts resources related to a sending unit of the intermediate node, the ping packet or response packet may be sent prior to other packets already received and waiting for transmission at the node.

The transmission suspender 1002 stores the other packets currently being sent or waiting for transmission and suspends transmission. In this case, with respect to the other packets, even though a part of the other packet is already sent, all bytes of the other packet may be stored.

The packet sender 1003 sends the ping packet or response packet to the successive node or a destination node of the ping packet or response packet.

The resume sending unit 1004 resumes the transmission of the other packets after completion of the transmission of the ping packet or response packet.

As described above, according to exemplary embodiments of the present invention, when a certain node of a packet network receives a ping packet or response packet not destined for the same node, a pre-emptive priority is given to the ping packet or response packet, other packets currently being sent or waiting for transmission remain stored and wait until completion of transmission of the ping packet or response packet, thereby more precisely determining a propagation delay and a distance between nodes without an intermediate node delay.

Also, when the node receives a ping packet destined for the node, a field of the ping packet may be changed and the ping packet is sent to a source node of the ping packet, as a response packet of the ping packet, thereby reducing a delay of the ping packet at a destination node to more precisely determine a propagation delay and a distance between the nodes. Establishing a connection or replaying contents may be allowed to a node within a desired distance or area by the determination of the distance, thereby performing DRM of the contents.

The methods described herein may be executed by a program instruction being executed via various computer units and may be recorded in a computer-readable recording medium. The computer-readable medium may include a program instruction, a data file, and a data structure, separately or cooperatively. The program instructions and the media may be those specially designed and constructed for the purposes of the present invention, or they may be of the kind well-known and available to those skilled in the art of computer software arts. Examples of the computer-readable media include magnetic media (e.g., hard disks, floppy disks, and magnetic tapes), optical media (e.g., CD-ROMs or DVDs), magneto-optical media (e.g., optical disks), and hardware devices (e.g., ROMs, RAMs, or flash memories, etc.) that are specially configured to store and perform program instructions. Examples of the program instructions include both machine code, such as produced by a compiler, and files containing high-level language codes that may be executed by the computer using an interpreter. The hardware elements above may be configured to act as one or more software modules for implementing the operations of this invention.

An exemplary aspect of the present invention is to precisely and securely measure a propagation delay and a distance between nodes by cutting through, without an intermediate node delay by a process of giving a pre-emptive priority to a ping packet or response packet, storing other packets currently in transmission or waiting for transmission, and resending the other packets after completion of transmission of the ping packet or response packet when the ping packet or response packet that is not destined for the same node in a packet network is received by the node.

An exemplary aspect of the present invention is also to more precisely measure a propagation delay and a distance by changing a field of a ping packet and sending the ping packet to a source node of the ping packet as a response packet when the ping packet whose destination is a certain node is received.

An exemplary aspect of the present invention is also to perform DRM of contents by allowing a destination node within a desired distance or zone to establish connection or replay of the contents, by determining the distance.

Although a few exemplary embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method for measuring a distance between nodes in a packet network, the method comprising:
    transmitting a ping packet from a first node to a second node through one or more intermediate nodes;
    determining a departure time of the ping packet;
    changing the ping packet to a response packet;
    transmitting the response packet that corresponds to the ping packet from the second node to the first node through the one or more intermediate nodes;
    prioritizing at the one or more intermediate nodes the transmission of at least one of the ping packet and the response packet;
    determining a prioritized round-trip time by determining an arrival time of the response packet;
    determining a distance between the first node and the second node based on the prioritized round-trip time,
    wherein the prioritizing of the transmission for at least one of the pine packet and the response packet comprises storing other packets that are in the process of being transmitted, suspending the transmission of the other packets, and transmitting at least one of the ping packet and the response packet without delay.

2. The method of claim 1, wherein the prioritizing of the transmission of at least one of the ping packet and the response packet further comprises:
    receiving at least one of the ping packet and the response packet by at least one of the one or more intermediate nodes;
    giving priority to at least one of the received ping packet and the received response packet;
    transmitting at least one of the received ping packet and the received response packet to at least one of another third node and the second node; and
    resuming transmission of the other packets after the transmission of at least one of the ping packet and response packet are completed.

3. The method of claim 1, wherein the transmitting a response packet that corresponds to the ping packet from the second node to the first node comprises:
    exchanging an address of the first node included in the ping packet with an address of the second node included in the ping packet;
    changing a packet type identifier included in the ping packet from a ping type to a response type; and
    sending the ping packet to the first node, as the response packet.

4. The method of claim 1, wherein the first node, the second node, and the one or more intermediate nodes comprise a dedicated unit for processing an input packet, and the first node, the second node, and the one or more intermediate nodes of the packet network processes the ping packet, the response packet, or the intermediate node delay via the dedicated unit.

5. A method for processing a packet in a dedicated unit included in an intermediate node in a packet network, the method comprising:

receiving a ping packet that is not destined for the intermediate node;

determining a packet kind of the packet received at the node; and processing the ping, packet at the intermediate node, based on the packet kind by storing other packets that are in the process of being, transmitted by the intermediate node, suspending the transmission of the other packets, and transmitting the ping packet without delay to a successive node, wherein when the received packet is ping packet the dedicated unit changes a field of the packet and sends the packet, as a response packet, to a source node, when the received packet is a response packet the dedicated unit computes a round-trip time of a ping packet or the response packet, and when the received packet is not destined for the node the dedicated unit removes a delay of the packet.

6. The method of claim 5, wherein the transmitting of the ping packet without delay at the intermediate node and sending the ping packet to a successive node comprises:

assigning pre-emptive priority to the ping packet when receiving the ping packet;

transmitting the ping packet to the successive node or a destination node; and resuming transmission of the other packets after the transmission of the ping packet is completed.

7. The method of claim 5, further comprising authenticating the ping packet by the intermediate node, wherein the ping packet responds to the authentication of the intermediate node using a security key that is shared with the packet network.

8. A computer-readable recording medium being executed by a computer and including a set of instructions for executing a method of measuring a distance between nodes in a packet network, the instructions comprising:

a first set of instructions for transmitting a ping packet from a first node to a second node through one or more intermediate nodes;

a second set of instructions for determining a departure time of the ping packet;

a third set of instructions for changing the ping packet to a response packet and transmitting the response packet, that corresponds to the ping packet, from the second node to the first node through the one or more intermediate nodes;

a fourth set of instructions for prioritizing at the intermediate node the transmission of at least one of the ping packet and the response packet;

a fifth set of instructions for determining a prioritized round-trip time by determining an arrival time of the response packet;

a sixth set of instructions for determining a distance between the first node and the second node based on the prioritized round-trip time, wherein the prioritizing of the transmission for at least one of the pine packet and the response packet comprises storing other packets that are in the process of being transmitted, suspending the transmission of the other packets, and transmitting at least one of the ping packet and the response packet without delay.

9. A node system for measuring a distance between nodes in a packet network, the system comprising:

a source node unit for transmitting a ping packet from a source node to a destination node, determining and storing a departure time of the ping packet, and measuring a distance between the source node and the destination node;

a destination node unit for receiving the ping packet, changing the ping packet to a response packet, and sending the response packet to the source node when the received ping packet is destined for the destination node;

at least one intermediate node unit for prioritizing transmission of at least one of the ping packet and the response packet to a successive node without an intermediate node delay, wherein the intermediate node unit comprises a transmission suspender for storing other packets that are in the process of being transmitted by the intermediate node unit, for suspending the transmission of the other packets, and for transmitting at least one of the ping packet and the response packet without delay;

a computer for computing a prioritized round-trip time by determining an arrival time when a response packet destined for the source node is received; and a distance measurer for determining a distance between the source node and the destination node, based on the prioritized round-trip time.

10. The node system of claim 9, wherein the intermediate node unit comprises:

a pre-emptive priority giver for giving pre-emptive priority to at least one of the ping packet and response packet when receiving the ping packet or response packet, respectively;

a packet sender for transmitting the ping packet to a successive node or a destination node and for transmitting the response packet to another successive node or a source node; and a resume sending unit for resuming transmission of the other packets after the transmission of the at least one of the ping packet and the response packet are completed.

11. The node system of claim 9, wherein the destination node unit comprises:

an address exchanger for exchanging a source address and a destination address included in the ping packet;

a packet type changer for changing a packet type included in the ping packet into a packet type of the response packet; and a packet sender for sending the ping packet to the source node, as the response packet.

\* \* \* \* \*